United States Patent [19]

Klein

[11] Patent Number: 4,782,471
[45] Date of Patent: Nov. 1, 1988

[54] OMNIDIRECTIONAL TRANSDUCER OF ELASTIC WAVES WITH A WIDE PASS BAND AND PRODUCTION PROCESS

[75] Inventor: Siegfried Klein, 42 Rue de la Tour d'Auvergne, Paris 75009, France

[73] Assignees: Commissariat a l'Energie Atomique; Siegfried Klein, both of Paris, France

[21] Appl. No.: 768,039

[22] Filed: Aug. 21, 1985

[30] Foreign Application Priority Data

Aug. 28, 1984 [FR] France .................. 84 13296
Nov. 13, 1984 [FR] France .................. 84 17282
Nov. 13, 1984 [FR] France .................. 84 17283

[51] Int. Cl.$^4$ .......................................... H04R 15/00
[52] U.S. Cl. ...................... 367/168; 367/172; 367/174
[58] Field of Search ............... 367/168, 172, 174; 310/26, 337, 371

[56] References Cited

U.S. PATENT DOCUMENTS

| | | | |
|---|---|---|---|
| 2,407,643 | 9/1946 | Batchelder | 367/168 |
| 2,670,446 | 2/1954 | Turner | 310/26 |
| 2,761,118 | 8/1956 | Wallace | 367/168 |
| 2,832,952 | 4/1958 | Bagno | 340/384 |
| 2,939,970 | 6/1960 | Dranetz et al. | 367/157 |
| 3,230,504 | 1/1966 | Horan et al. | 310/371 |
| 3,317,762 | 5/1967 | Corwin et al. | 310/371 |
| 3,346,841 | 10/1967 | Weichart | 367/168 |
| 3,774,134 | 11/1973 | Kardashian | 310/26 |
| 3,881,165 | 4/1975 | Parker et al. | 340/3 |
| 4,216,352 | 8/1980 | Chamuel | 178/19 |
| 4,497,046 | 1/1985 | Savage | 310/26 |
| 4,541,081 | 9/1985 | Smith | 367/168 |

FOREIGN PATENT DOCUMENTS 0063094 10/1982 European Pat. Off. .
0075911 4/1983 European Pat. Off. .
486086 10/1929 Fed. Rep. of Germany .
402831 12/1933 United Kingdom .

OTHER PUBLICATIONS

Engineering, vol. 207, 17.1.1969, pp. 117-120, London, B. K. Gazey: "Underwater Electroaccoustic Transducers".

Primary Examiner—Charles T. Jordan
Assistant Examiner—Richard Klein
Attorney, Agent, or Firm—Pearne, Gordon, McCoy & Granger

[57] ABSTRACT

Omnidirectional, wide pass band, elastic wave transducer comprising a rigid magnetostrictive diaphragm, each surface element of the diaphragm constituting a unidirectional elastic wave transducer in its normal direction, and an electric control means provided with two electric terminals for producing in the vicinity of the diaphragm a homogeneous magnetic field in keeping with an electric signal applied to the terminals of the control means or for supplying an electric signal in keeping with the variation of the magnetic field in the diaphragm as a function of an elastic wave received. The diaphragm is preferably a closed surface of revolution.

Application in submarine transmission (hydrophone) and in high fidelity sound reproduction (loudspeaker, microphone) with a very wide pass band.

8 Claims, 4 Drawing Sheets

OMNIDIRECTIONAL TRANSDUCER OF ELASTIC WAVES WITH A WIDE PASS BAND AND PRODUCTION PROCESS

BACKGROUND OF THE INVENTION

The present invention relates to an omnidirectional transducer for elastic waves with a wide pass band. The term elastic waves is understood to mean a pressure wave transmitted in a liquid or a gas. In the latter case an elastic wave is often called a sound or acoustical wave. The transducer can be used in transmission and it then converts an electrical signal into an elastic wave, or in reception and then converts an elastic wave into an electrical signal. The transducer according to the invention is particularly adapted to the transmission of sound and ultrasonic waves.

The submarine transmission of high frequency elastic signals (ultrasonic waves) constitutes a preferred field of application of the present invention. The transducer can be used there like a hydrophone, both as a receiver and a transmitter. The wide pass band of this transducer enables the transmission of signals with a high frequency, such as e.g. television signals specially adapted for transmission in water (pass band of approximately 200 kHz), speech signals or any other information signal.

High fidelity sound reproduction constitutes another preferred field of application for the invention. The transducer used in transmission provides a high performance loudspeaker with a wide pass band.

The principle of the transducer according to the invention is based on the magnetostriction effect. Magnetostriction is the property of certain materials to undergo a geometrical modification (contraction, expansion, bending, twisting, etc.), when subject to the influence of a magnetic field. Metal alloys and in particular ferromagnetic compounds are magnetostrictive materials.

The use of such materials for converting an electric wave into an elastic wave is not new. French Pat. No. 7 702 333 entitled "Electroacoustic transducer with a magnetostrictive core" describes such a device.

This known transducer fundamentally has a magnetostrictive bar arranged in a solenoid. When a voltage signal is applied to the terminals of the coil, it produces in the solenoid axis a magnetic field, which expands or contracts the magnetostrictive bar as a function of the nature of the magnetostrictive material used. At each of the ends of the magnetostrictive bar, this produces an elastic wave which is propagated in a direction substantially parallel to the magnetostrictive bar axis.

Thus, it acts here as a monodirectional electroacoustic transducer, because the elastic wave is only transmitted in the direction of the bar axis. This axial transmission character is not desired in all applications and can constitute a serious disadvantage, particularly in the high fidelity reproduction of sound waves, where it is desired that the elastic wave is transmitted with the same intensity in all directions.

Figure 1:
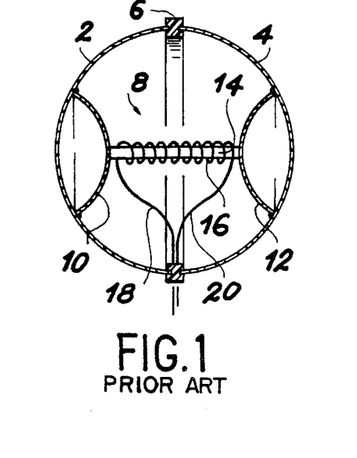
FIG. 1: already described, a substantially omnidirectional electroacoustic transducer according to the prior art.

French Pat. No. 8,106,150 entitled "Omnidirectional loudspeaker for very high frequencies of the sound spectrum" describes an electroactoustic transducer usable in air, which makes it possible to produce a substantially omnidirectional elastic wave, on the basis of the linear expansion or linear contraction, as a function of the material used, of a magnetostrictive bar. FIG. 1 shows a loudspeaker construction in accordance with the teaching of this patent.

This loudspeaker essentially comprises two rigid hemispheres 2, 4, which are interconnected by an elastic annular joint 6, to which they can be fixed by bonding, so as to form a pulsating sphere, together with a control element 8 placed within the sphere and rigidly connected to the hemispheres 2, 4.

The control element 8 is elongated and can undergo a length variation in response to an electrical signal which is to be converted into an elastic wave. The control element is oriented within the sphere in such a way that the forces resulting from these length variations are transmitted to the hemispheres 2, 4, in directions perpendicular to the connection plane of said hemispheres.

The length of this control element 8 is preferably less than the diameter of the sphere, and it is then connected to the hemispheres 2, 4 by rigid transmission parts 10, 12, which then engage perpendicularly on hemispheres 2, 4 at locations sufficiently remote from the region of their tops to ensure that each of the said hemispheres is displaced or vibrates continuously, in response to length variations of the control element 8. These transmission parts are substantially shaped like a spherical cap.

The control element 8 is constituted by a bar 14, having a circular or square cross-section and made from a magnetostrictive material, about which is arranged induction coil 16. The electrical signal to be converted into an elastic wave is applied to the ends of the coil 16 by two electrical conductors 18, 20, which pass through an opening formed in annular joint 6.

The transmission parts 10, 12 make it possible to convert the linear expansion of the magnetostrictive bar 14 into a displacement of each of the two hemispheres 2, 4. The elastic wave produced is thus substantially omnidirectional.

However, the wave produced cannot be perfectly omnidirectional, which in part is due to the presence of the elastic annular joint 6 joining the two hemispheres and which consequently prevents the transmission of the sound wave in its plane, whilst also being due to the fact that the transmission parts do not modify the linear character of the transmitted force. Thus, it is not precisely a pulsating sphere, i.e. having a radius which is variable, but identical at each point at a given instant, but is instead merely two hemispheres simultaneously having a linear movement in the same direction and of the opposite sense.

SUMMARY OF THE INVENTION

The object of the invention is to obviate the disadvantages of the known devices, particularly the absence of a true omnidirectionality. This object is achieved by the use of a rigid magnetostrictive material diaphragm or membrane, and an associated electric control means. Each surface element of said diaphragm constitutes a unidirectional transducer of an elastic wave in its normal direction.

The diaphragm can have a random shape. This shape defines the transmission direction through an elastic wave as directions normal to each surface element of the diagraphm. A diaprahm shaped like a closed surface (sphere, ellipsoid, cylinder closed by two hemispheres, etc) consequently gives the transducer an omnidirectional character. The diaphragm of the transducer according to the invention can also have a non-closed surface shape and e.g. in the case of a hemispherical shape, the transducer is omnidirectional in a half-price in space.

The electrical control means associated with the diaphragm is provided with two electric terminals and is positioned in the vicinity of at least part of the diaphragm. This, in the vicinity of said diaphragm, it produces a substantially homogeneous magnetic field in response to an electrical signal applied between its terminals. This magnetic field leads to a geometrical modification (expansion or contraction) of each surface element of the diaphragm, which produces an elastic wave. Conversely, when an elastic wave reaches the diaphragm, the geometrical modification thereof under the action of said elastic wave (pressure, vacuum) modifies the value of the permanent magnetic field polarizing the transducer. The latter is clearly indispensable if it is wished to ensure that the transmitted or received frequency is to be doubled. The control means is designed for detecting variations in said polarizing magnetic field and will consequently supply an electrical signal corresponding to the variation of said field.

In a preferred manner, the transducer comprises a means for the continuous polarization of the diaphragm, which can be a magnet or a d.c. voltage source supplying the electric control means. The continuous polarization is necessary when the transducer is used in reception, i.e. when it converts an elastic wave into an electrical signal. A continuous polarization is also desirable, but not obligatory, for transmitting an elastic wave as a function of an electrical signal supplied to the control means.

Advantageously, when the diaphragm is a closed surface, the latter is equipped with means for equalizing its internal and external pressures. This is particularly important in the case e.g. where it is wished to use the transducer underwater at variable depth.

The equalizing of the internal and external pressures can be brought about in a simple manner by making at least one small hole in the diaphragm. The pressure on the outer face of the diaphragm can also be compensated by filling the internal volume of the diaphragm with an elastic material. In the case where the diaphragm is immersed in a liquid, e.g. water, compensation is only perfect for a given depth. This embodiment however makes it possible to use the transducer over a certain depth range.

In a preferred manner, when the diaphragm forms a closed or almost closed surface, the internal volume of the diaphragm is filled with an elastic wave-absorbing material, such as cotton or glass wool, in order to absorb the elastic waves transmitted by each surface element of the diaphragm in said internal volume, in order to prevent parasitic reflections.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Hereinafter a description is provided of several embodiments of a transducer according to the invention, in which the diaphragm is a sphere. It is obvious that this shape has only been taken in exemplified manner and that the transducer according to the invention can be provided with a diaphragm having a random shape, which can be closed (ellipsoid, closed cylinder, etc.) or open (hemisphere, cone, open cylinder, etc.). This membrane is not necessarily a surface of revolution.

Figure 2:
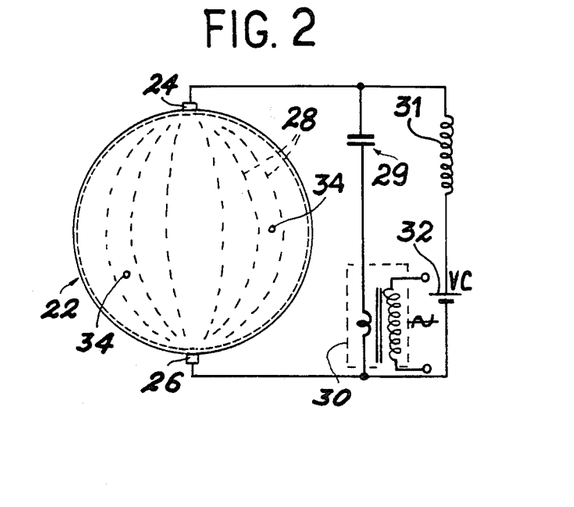
FIG. 2: a first embodiment of the omnidirectional transducer of elastic waves according to the invention, in which the diaphragm is constituted by a magnetostrictive layer.

FIG. 2 shows a first embodiment of the omnidirectional elastic wave transducer according to the invention constituted by a hollow magnetostrictive material sphere 22 constituting the diaphragm and is provided at two diametrically opposite points with electrical connections 24, 26 constituting the terminals of the electric control means.

Magnetostrictive materials are well known to the expert. It is merely pointed out that they are placed in four main groups which are metallic alloys, ferrites, iron - rare earth compounds and magnetic amorphous compounds or metallic glasses. Among the most widely used metallic alloys reference can be made to polycrystalline nickel, as well as certain iron - nickel, iron - aluminium, nickel-cobalt, and iron-cobalt alloys.

Nickel-cobalt alloys are interesting materials in that they combine the advantages of a high electromechanical coupling coefficient, ease of manufacture and high corrosion resistance. For example, material consisting of 96% nickel and 4% cobalt has an electromechanical coupling coefficient of 0.5.

Sphere 22 is a homogeneous pulsating sphere. Thus, when a voltage difference is applied between the sphere connections 24, 26, all the points of the sphere constitute identical elastic wave transmitters, and the sphere is consequently a perfect omnidirectional elastic wave transmitter.

The current traversing the sphere follows the meridians 28. This current is higher per surface unit close to the poles (connections 24, 26) than close to the equator, which aids a greater pulsation amplitude close to the poles. However, the connections 24, 26 make the sphere more rigid close to the poles, which limits the pulsation amplitude. These two opposing effects are substantially balanced out, all the surface elements of the sphere consequently having roughly the same vibration amplitude.

Figure 3:
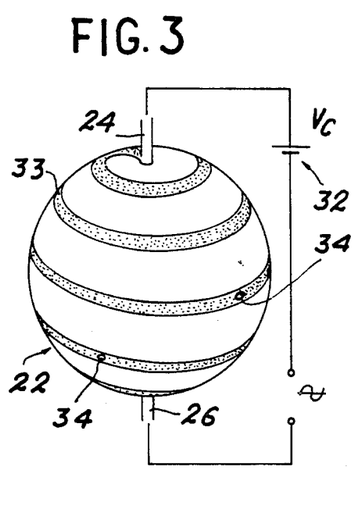
FIG. 3: a variant of the transducer of FIG. 2, in which the diaphragm is obtained from a magnetostrictive strip.

The impedance between connections 24, 26 is low. For a sphere with a diameter of a few centimetres and a thickness of a few microns, it is a few tenths of an ohm. This impedance is low and requires a matching transformer 30 to permit direct connection to the conventional amplifiers, e.g. used in the high fidelity field. This impedance matching transformer can be eliminated in the case where the impedance of sphere 22 between connections 24, 26 is only a few ohms. The transducer of FIG. 3 is an illustration thereof. Elements identical to those of FIG. 2 carry the same references. Sphere 22 is obtained on the basis of that of FIG. 2 by cutting into a strip in the same way as is obtained on peeling fruit. An elastic joint 33 makes it possible to reconstitue a rigid sphere.

The impedance of the sphere, which is a function of the length of a meridian 28 in the transducer of FIG. 2, is a function of the length and the width of the magnetostrictive strip in the transducer of FIG. 3. It is consequently greater in the latter case and can be adjusted for a fixed sphere, as a function of the strip width.

The transmitter according to the invention has the advantage compared with known equipment of a very wide pass band. For example, this pass band extends from a few kilohertz to a few hundred kilohertz for a diameter 4 cm sphere. The centre frequency of the pass band is linked with the size of the sphere. For the transmission of low frequencies, it is necessary to displace a large volume of fluid (water, air, etc.) and in this case the sphere has an adequate diameter.

Experience has shown that the power of the elastic wave transmitted can be significant. This acoustic power is mainly limited by two factors, which are on the one hand the magnetic saturation of the magnetostrictive material by a too intense magnetic field and on the other hand by excessive heating of the sphere. It is of interest to note that the maximum relative power which can be applied to the sphere is much higher if it is immersed in water than if it is immersed in air. A nickel-cobalt alloy sphere with a diameter of 4 cm and a thickness of 0.01 mm can consequently absorb without difficulty a charge exceeding 50 W.

Figure 5A:
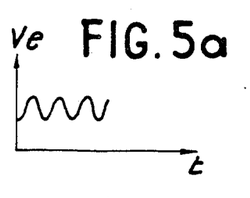
FIGS. 5a and 5b: chronograms respectively representing an electrical signal $V_e$ applied to the diaphragm of the transducers of FIGS. 2 and 3 and to the corresponding transmitted elastic wave A.
Figure 5B:
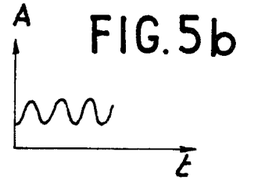

According to a preferred embodiment, sphere 22 (FIGS. 2 and 3) is continuously polarized by a d.c. voltage supply 32. This makes it possible to produce an acoustic wave, whose amplitude A represented in FIG. 5b is proportional to the electric voltage signal $V_e$ applied to the terminals of sphere 22 and shown in FIG. 5a.

When the transducer comprises an impedance matching transformer 30 and a d.c. voltage supply 32, as in the case of the transducer of FIG. 2, said two elements are preferably isolated. They are arranged in parallel to terminals 24, 26 of sphere 22. Conventionally the arrangement is completed by a capacitor 29 in series with transformer 30, in order to prevent the transmission of a continuous electrical signal into the transformer and by a choke 31 in series with supply 32 for preventing the transmission of a transient signal to supply 32.

The polarization of the sphere is not obligatory when the transducer is used in transmission, but this leads to the doubling of the frequencies of the electrical signal. However, this polarization is necessary in reception. The voltage applied to the poles of the sphere is then modified by the elastic wave received.

The spheres shown in FIGS. 2 and 3 are provided with two openings 34, making it possible to keep equal the pressures on the internal and external surfaces. There is a random number of openings or holes, but generally one or two are sufficient. The size of the holes is preferably small, so as not to disturb the homogeneity of the sphere.

These equalization means are not necessary if the sphere is immersed in air. However, if it is used e.g. in water, the pressure exerted on the outer face of the sphere is high and must be compensated, the holes 34 effecting this compensation.

It is known that pure water is inelastic. Thus, it cannot be used for filling the sphere, which could not then pulsate. However, no disadvantage results from the use of natural water (lake water, sea water, etc.) which, containing free oxygen and microorganisms, has a certain elasticity.

The holes can be replaced by an elastic material filling the interior of the sphere. In this latter case, the sphere is manufactured in the following way. A sphere is made in an elastic material, e.g. a foam, followed by the deposition, according to any known process and e.g. by vacuum evaporation, of a homogeneous layer of magnetostrictive material over the entire surface of said sphere.

A description will now be given of a special way of producing the hollow sphere in the form of a single element as shown in FIG. 2. Firstly a hollow spherical mould is made from a rigid material, e.g. a plastic material. For example, it would be possible to use a plastic material similar to that for producing ping pong or table tennis balls. As in the case of the latter, the spherical mould can be produced by bonding two hemispheres.

The spherical mould is then covered with a layer of an electrically conductive material, e.g. a metal such as copper. This layer is produced in per se known manner, such as by chemical vapour phase deposition. The thickness of the layer is e.g. 0.1 mm. This is followed by the deposition by electrolysis of a magnetostrictive material layer. The magnetostrictive material is e.g. a nickel-cobalt alloy and its thickness can be approximately 0.01 mm for a sphere with a diameter of 4 cm.

In a following stage, two holes are made at diametrically opposite points of the sphere and make it possible to eliminate the hollow mould and the electrically conductive layer. They will be subsequently used for receiving connections 24 and 26.

The sphere is then immersed in a bath for dissolving the mould. In the case where the mould is made from a plastic material similar to that of ping pong balls, dissolving is easily obtained by immersing the sphere in acetone. Finally, the electrically conductive layer is eliminated by chemical etching, which does not etch the nickel.

The hollow magnetostrictive material sphere is then produced. It is then merely necessary to weld the electric wires at the two holes in the sphere in order to form connections 24, 26. Finally one or more holes 34 can be made to equalize the internal and external pressures if the sphere is used in water (hydrophone) or in a liquid in general terms.

A variant of the sphere production process consists of directly depositing, e.g. by electrolytic deposition, the layer of magnetostrictive material on the mould. This makes it possible to eliminate the stage of depositing an electrically conductive material layer. The Applicant has produced spheres in accordance with each of these processes. They are made from an alloy consisting of approximately 90% nickel and 10% cobalt.

In general terms, any known method for depositing on a mould can be used.

Two processes are given for producing a sphere as a single element. These processes can be difficult to perform in certain special cases, particularly when it is wished to produce a sphere having a large diameter (e.g. exceeding about 10 cm). In this case, it may be preferable to separately produce two identical hemispheres from magnetostrictive material and then to weld together said two hemispheres.

Figure 4:
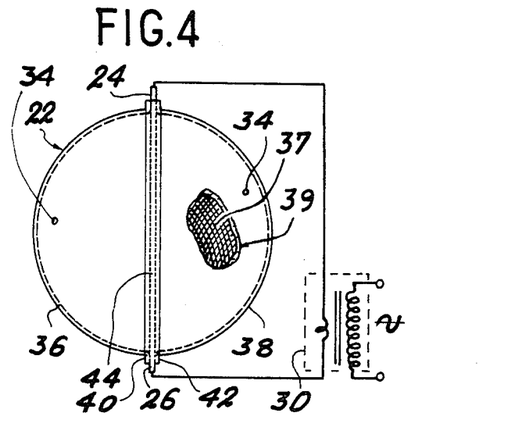
FIG. 4: another variant of the omnidirectional elastic wave transducer of FIG. 2.

A sphere obtained according to this production process is diagrammatically shown in FIG. 4. This sphere is constituted by two hollow hemispheres 36, 37, each formed by a magnetostrictive grating 37 or from similar materials such as a cloth, a fine metal sheet perforated with holes or the like, covered with or embedded in an electrically insulating layer 39. This layer makes it possible to block the holes of the grating, which is necessary for obtaining a good electoacoustic conversion efficiency. This grating has a mesh size of approximately 1 mm. The two rows of crossing wires can both be made from a magnetostrictive material. However, it is also possible to use a grating, whereof only the row of wires forming the meridians of the sphere (connections 24 and 26 forming the poles) are made from a magnetostrictive material, whilst the other row of wires can be made from a random material, particularly an electrically insulating material. When this embodiment is used for sound generation in air, this insulating layer can be obtained by applying a material, such as that used for producing conventional loudspeakers.

In order to facilitate their connection by welding, the base of each hemisphere can comprise a ring 40, 42. The two hemispheres are e.g. joined by soft soldering or argon welding, the weld engaging on each ring.

Preferably, connections 24 and 26 are produced at two diametrically opposite points of the sphere located on the weld. This makes it possible to have a substantially homogeneous pulsating sphere because all the meridians connecting the two connections 24, 26 forming the poles are identical. with the exception of the two meridians corresponding to the weld 44.

Sphere 22 shown in FIG. 4 functions in exactly the same way as sphere 22 shown in FIG. 2. It can be used both in transmitting and in reception. In transmission, it may or may not be polarized, whereas in reception it must be polarized.

In the case where the sphere is used in transmission and is not polarized, as shown in exemplified manner in FIG. 4, the alternating electrical signal which has to be converted into an elastic wave is directly transmitted to the two connections 24, 26, of the sphere via an impedance matching means which can be a transformer 30.

Figure 6A:
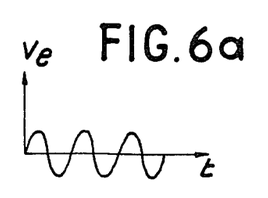
FIGS. 6a and 6b: chronograms respectively representing an electrical signal $V_c$ applied to the diaphragm of the transducer of FIG. 4 and the corresponding transmitted elastic wave A.
Figure 6B:
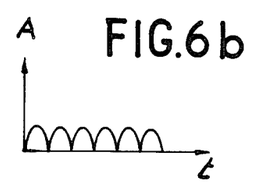

FIGS. 6a and 6b illustrate the relationship between the electrical signal $V_e$ applied to the connections 24 and 26 of sphere 22 of FIG. 4 and the characteristic A of the elastic wave transmitted in the absence of sphere polarization. The sphere in this case constitutes a transmitter, which doubles the frequency of the electrical signal.

The sphere shown in FIG. 4 can also be realized on the basis of two hemispheres, each having a structure identical to that of the sphere shown in FIG. 1. The hemispheres are produced in the same way as the sphere of FIG. 1 and are then jointed by welding, bonding or the like.

Another effective, easy and inexpensive method for producing magnetostrictive material hemispheres is stamping. This makes it possible to easily obtain hemispheres with a diameter of several dozen centimeters, which is particularly advantageous because a single transducer can then reproduce all the frequencies of the sonic spectrum.

Figure 7:
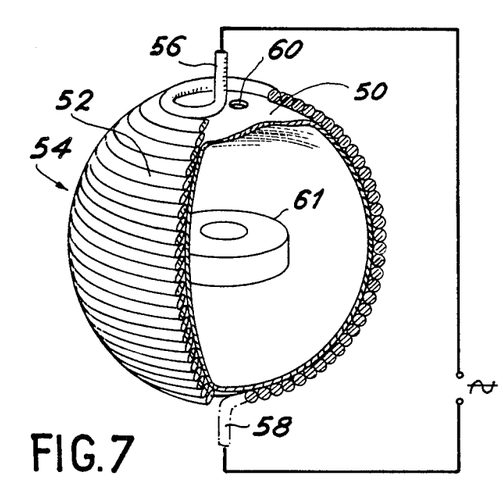
FIG. 7: a second embodiment of the transducer according to the invention, in which the electric control means is an insulated electric conductor wound on to the diaphragm.
Figure 8:
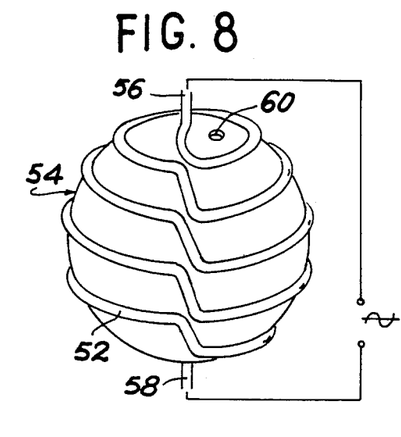
FIG. 8: a variant of the transducer of FIG. 7.

FIGS. 7 and 8 show a second embodiment of the transducer according to the invention, in which the diaphragm is a magnetostrictive sphere and the control means is an insulated electric conductor wound around said diaphragm. Unlike in the first embodiment illustrated by FIGS. 2 and 4, there is no longer in the transducer according to FIGS. 7 and 8 electrical contact between the diaphragm and the electric control means.

A first variant of the second embodiment is shown in FIG. 7. This transducer comprises a hollow magnetostrictive material sphere 50 about which is wound an insulated electric conductor 52, which thus forms a spherical coil 54.

The hollow sphere 50 is produced as a single element by deposition, e.g. by vacuum evaporation, of a nickel alloy coating on to a spherical mould, making a hole in the sphere and then eliminating the mould by dissolving.

Coil 54 is e.g. made from a copper wire having a diameter of approximately 0.1 to 0.2 mm for a sphere with a diameter of a few centimeters. This copper wire is electrically insulated by enamelling, sheathing or the like. The turns of the coil are preferably contiguous, which improves the homogeneity and sensitivity of the transducer. The rigidity of the coil is ensured by an appropriate, not shown coating layer.

The ends 56, 58 of coil 54 constituting the terminals of the electric control means make it possible, in transmission, to supply an a.c. voltage signal which is transformed by the sphere into an elastic wave. On reception, at ends 56, 58 of said coil is produced an a.c. voltage signal corresponding to an elastic wave received provided that, in the preceding cases, there is a magnetic polarization of the sphere.

This embodiment has the advantage that the impedence between the terminals of the electric control means is a few ohms (for a coil with a diameter of a few centimetres made from copper wire with a diameter of 0.1 mm and having contiguous turns, whereas in the transducers according to FIGS. 2 and 4, said impedence is much lower. It is consequently possible in most cases to eliminate the impedance matching transformer.

In the case of using the transducer in a fluid such as water, the sphere must be equipped with means for equalizing the internal and external pressures. This equalization can be simply carried out by at least one opening 60 in the sphere, in order to fill said sphere with the desired fluid. As these openings or holes are not to be covered by coil 54, they can advantageously be positioned close to one end 56 or 58 of said coil. These equalizing means are particularly necessary if the transducer used at a significant depth in the case of water. They are of no use if the working depth is limited.

The transducer shown in FIG. 7 can be completed by a polarization source. Any known polarization means can be used, e.g. a d.c. voltage supply, as shown in FIGS. 2 and 3, or a permanent magnet 61 located in the sphere. The magnet can easily be maintained in position when the interior of the sphere is filled with an elastic wave-absorbing material. Polarization is necessary in reception. However, the transducer can operate without polarization in transmission. However, in this case, the elastic wave transmits at double the frequency of the alternating electrical signal applied.

The omnidirectional transducer according to FIG. 7 operates as follows. In reception, an elastic wave is received produces a pulsation of the magnetorestictive material sphere. This pulsation induces an electric current in coil 54 and consequently a modulation of the potential difference in coil ends 56 and 58. In transmission, the phenomenon is reversed. The variation of the potential difference in coil ends 56, 58 consequently the current passing through said coil leads to a modification of the magnetic field in said coil. This modification leads to the pulsation of sphere 50 and consequently to the transmission of an elastic wave.

A variant of the transducer of FIG. 7 is shown in FIG. 8. The turns of the electric conductor 52 are no longer contiguous which makes it possible not to increase the impedance between the ends 56, 58 beyond a few ohms, even if the sphere 22 is of considerable size. Electric conductor 52 is wound so as to produce turns in a plane substantially perpendicular to the axis passing through the ends 56, 58. In this variant, the sphere can have a diameter of several dozen centimetres. It can then reproduce all the sonic frequencies (low, medium and very high) and can be used in high fidelity sound reproduction as universal loudspeaker.

Figure 9:
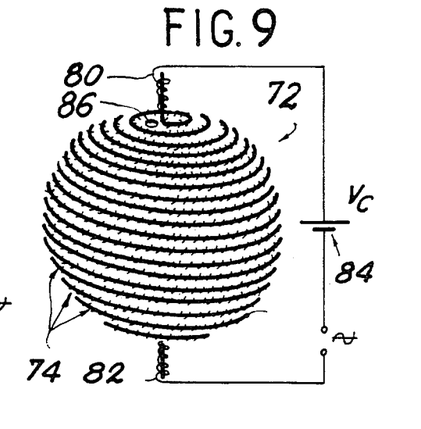
FIG. 9: a third embodiment of the transducer according to the invention, in which the diaphragm is obtained by winding a magnetostrictive wire.
Figure 10:
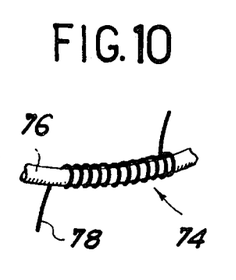
FIG. 10: the winding of an electrical conductor constituted by the electric control means around the magnetostrictive wire of the transducer of FIG. 9.

FIGS. 9 and 10 show a third embodiment of the omnidirectional elastic wave transducer according to the invention.

The transducer shown in FIG. 9 comprises a spherical coil 72 obtained by winding a wire 74. For reasons of clarity, a coil with non-contiguous turns is shown. However, in practice, a coil with contiguous turns is preferable, because the omnidirectionality improves with the homogeneity of the coil.

As shown in FIG. 10, wire 74 is constituted by a magnetostrictive material wire 76, on to which is wound an electrically conductive wire 78. The latter is electrically insulated from the magnetostrictive wire and can be constituted e.g. by a sheathed or enamelled copper wire. The ends of this electrically conductive wire constitute the ends 80, 82 of the spherical coil and the terminals of the electrical control means.

According to a preferred embodiment, spherical coil 72 is continuously polarized, e.g. by a d.c. voltage supply 84. The polarization of the spherical coil is not obligatory when the transducer is used in transmission, but in this case the frequency of the alternating electric signal applied is doubled. However, this polarization is necessary in reception. The voltage applied to the ends 80, 82 of the conductive wire is then modified by the elastic wave received.

Preferably, in order to ensure the rigidity of the spherical coil, the latter is covered by an appropriate coating layer (not shown in FIG. 9). This coating layer advantageously has at least one hole 86, made e.g. in the vicinity of the ends 80, 82 of the electrical conductor, in order to maintain equal the pressures on the inner and outer surfaces of the spherical coil, by permitting the fluid in which the transducer is immersed to penetrate the spherical coil.

The holes for equalizing the internal and external pressures can be replaced by an elastic material filling the interior of the sphere. In the latter case, the magnetostrictive wire is directly wound on to the elastic material sphere.

A description will now be given of a procedure for producing the omnidirectional transducer shown in FIG. 9. Use is made of a hollow spherical mould made from a rigid material, e.g. a plastic material. For example, it is possible to use a plastic material similar to that used for producing ping pong balls. As for the latter, spherical moulds can be produced by bonding together the two hemispheres.

This is followed by the bonding of wire 74 constituted by a magnetostrictive material wire 76 on to which is wound an insulated electrically conductive wire 78. The ends of the insulated conductive wire 78 constitute the terminals making it possible to excite the magnetostrictive material or detect a pulsation thereof. The spherical coil is then made rigid by depositing a coating layer.

In a following stage, at least one hole 86 is made in said coating layer, e.g. in the vicinity of one of the ends of the conductive wire, so as to permit the elimination of the hollow mould. This elimination is obtained by immersing the spherical coil in a bath which dissolves the mould. In the case where the mould is made from a plastic material similar to that of ping pong balls, this dissolving is easily obtained by immersing the spherical coil in acetone. The opening made for dissolving the mould also makes it possible to maintain the internal and external pressures of the coil equal.

The invention has been described with reference to a transducer having a spherical magnetostrictive diaphragm. This example was chosen because the sphere is the most omnidirectional transmitter because this shape is the most advantageous in the reproduction of low frequencies for a diaphragm having a given surface. Thus, the lower frequency limit of the diaphragm becomes lower as the diaphragm diameter increases.

However, the invention is not limited to a transducer with a spherical diaphragm. For example, FIGS. 11 and 12 show transducers whose diaphragms are respectively shaped like a hollow cylinder and a cylinder portion and which are constituted by a magnetostrictive material grating coverd with or embedded in an electrically insulating layer, as in the case of FIG. 4.

Figure 11:
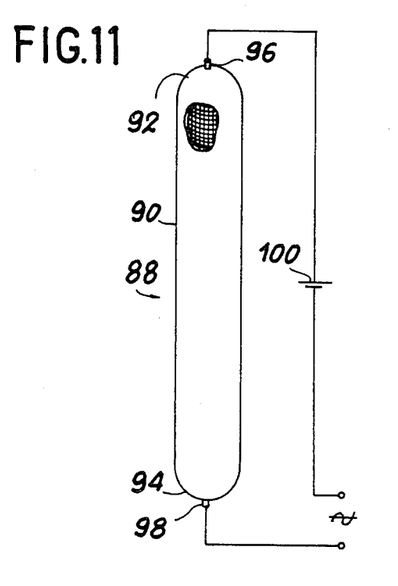
FIG. 11: an embodiment of the transducer according to the invention with a cylindrical diaphragm.

The diaphragm 88 of the transducer of FIG. 11 is constituted by a cylinder 90 with a circular base closed at its ends by two hemispheres 92, 94. The terminals of the control means are constituted by two connections 96, 98 fixed to the tops of the hemispheres 92, 94. For an adequately long cylinder, the impedance between the connections is a few ohms and it is not necessary to provide an impedance matching means in the case of a utilization in high fidelity sound reproduction.

In this case, a permanent transducer polarization means must be provided and can be of a random nature. For example the transducer of FIG. 11 has a d.c. voltage source 100.

Figure 12:
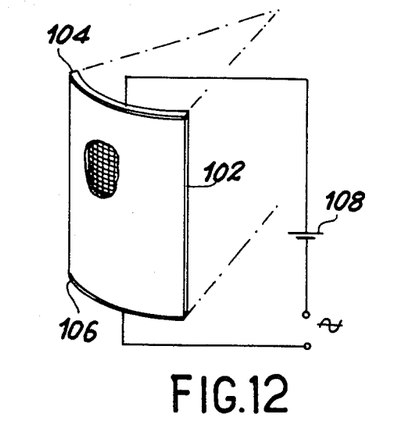
FIG. 12: an embodiment of the transducer according to the invention, whereof the diaphragm is a cylinder portion.

The transducer of FIG. 12 has a diaphragm 102 in the form of a cylinder portion. This surface is mathematically defined as a group of parallel lines of finite length bearing on a circular arc. The terminals of the control means are constituted by electrical conductors 104, 106 in circular arc form and connected to the upper and lower edges of the diaphragm. The transducer can be provided with a continuous polarization means, such as a d.c. voltage source 108. In the case where elastic wave transmission is only required to the outside i.e. from the convex side of the diaphragm, the inner face, i.e. the concave face can be covered with an elastic wave-absorbing material.

Although the object of the invention has been to propose an omnidirectional elastic wave transmitter and receiver, the transducer according to the invention can also be used in the transmission or reception of highly directional elastic waves. An example of such an application is shown in FIG. 13 in the case where the diaphragm is spherical.

Figure 13:
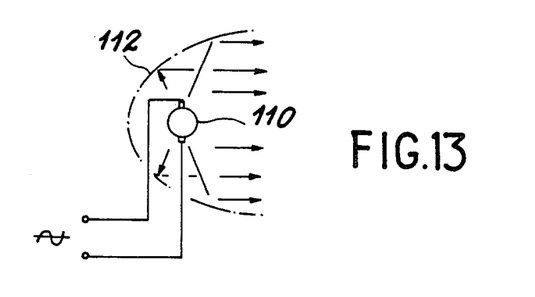
FIG. 13: the application of the omnidirectional elastic wave transducer with a spherical diaphragm according to the invention to producing a perfectly unidirectional intense elastic wave.

In FIG. 13, the spherical diaphragm 110 is placed in the focal point of a paraboloid of revolution 112. This arrangement makes it possible to obtain, in transmission, a high intensity unidirectional elastic wave and, in reception, a high sensitivity detector.

In conclusion, the main advantages of the transducer according to the invention are summarized below:
perfect omnidirectionality,
very wide pass band,
powerful transmitter, particularly in liquids, e.g. in water (hydrophone),
sensitive detector,
simple, therefore reliable and inexpensive transducer,
ease of manufacture.

The invention has been described with respect to special embodiments. However, it is obvious that the invention is not limited thereto and instead covers all transducers having a magnetostrictive diaphragm and an electric control means for said diaphragm, no matter what the shape of the diaphragm, the structure of the diaphragm, the type of the electric control means, the arrangement of said control means with respect to the diaphragm and the production process.

What is claimed is:

1. An elastic wave transducer comprising a rigid magnetostrictive diaphragm having a spherical shape, each elementary part of the surface of the diaphragm constituting a unidirectional elastic wave transducer in its normal direction, said transducer also comprising an electric control means provided with two electric terminals for producing in the vicinity of the diaphragm a homogeneous magnetic field in relation with an electrical signal applied to the terminals of the control means or for supplying an electrical signal in relation with the variation of the magnetic field in the diaphragm as a function of an elastic wave received, said control means being located close to said diaphragm so that any electrical current flowing between said electric terminals flows parallel to the surface of the diaphragm, said transducer including means for providing a continuous polarization of the diaphragm, said two electrical terminals being electrically connected respectively to two points on the diaphragm which are diametrically opposite each other.

2. A transducer according to claim 1, wherein the diaphragm comprises a magnetostrictive material grating, and an electrically insulating coating layer.

3. A transducer according to claim 1, wherein the diaphragm is formed from a magnetostrictive material layer.

4. A transducer according to claim 1, wherein the diaphragm is a surface of revolution.

5. A transducer according to claim 4, wherein the diaphragm is a closed surface.

6. A transducer according to claim 5, wherein the diaphragm comprises means for equalizing the internal and external pressures.

7. A transducer according to claim 6, wherein the internal volume of the diaphragm is filled with an elastic wave-absorbing material.

8. A transducer according to claim 4, wherein the diaphragm is asphere.

* * * * *